US010452529B1

(12) United States Patent
Davis et al.

(10) Patent No.: US 10,452,529 B1
(45) Date of Patent: Oct. 22, 2019

(54) TECHNIQUES AND DEVICES FOR CLOUD MEMORY SIZING

(71) Applicant: ServiceNow, Inc., Santa Clara, CA (US)

(72) Inventors: Joseph Michael Davis, Carlsbad, CA (US); Scott Michael Nemes, Kirkland, WA (US); Atul Saini, Bellevue, WA (US); Siddharth Shah, Kirkland, WA (US)

(73) Assignee: ServiceNow, Inc., Santa Clara, CA (US)

(*) Notice: Subject to any disclaimer, the term of this patent is extended or adjusted under 35 U.S.C. 154(b) by 571 days.

(21) Appl. No.: 14/736,424

(22) Filed: Jun. 11, 2015

Related U.S. Application Data

(60) Provisional application No. 62/010,621, filed on Jun. 11, 2014.

(51) Int. Cl.
G06F 12/02 (2006.01)
G06F 3/06 (2006.01)

(52) U.S. Cl.
CPC ........ *G06F 12/0238* (2013.01); *G06F 3/0604* (2013.01); *G06F 3/067* (2013.01); *G06F 3/0631* (2013.01); *G06F 3/0653* (2013.01)

(58) Field of Classification Search
CPC ..... G06F 17/30339; G06F 2009/45583; G06F 2212/163; G06F 2212/604; G06F 3/0631; G06F 12/0871; G06F 17/3048
See application file for complete search history.

(56) References Cited

U.S. PATENT DOCUMENTS

| | | | |
|---|---|---|---|
| 5,247,660 A | 9/1993 | Ashcraft et al. | |
| 5,758,146 A | 5/1998 | Schiefer et al. | |
| 5,812,996 A | 9/1998 | Rubin et al. | |
| 6,070,202 A | 5/2000 | Minkoff et al. | |
| 6,388,993 B1 | 5/2002 | Shin et al. | |
| 6,820,091 B2 | 11/2004 | Weigelt | |
| 7,480,750 B2 | 1/2009 | Shimizu | |
| 7,788,449 B2 | 8/2010 | Karn et al. | |
| 7,917,462 B1* | 3/2011 | Shatdal ............ G06F 17/30592 | |
| | | | 707/600 |
| 2002/0046204 A1 | 4/2002 | Hayes | |

(Continued)

OTHER PUBLICATIONS

Database Administrators, Stack Exchange Inc., 2015; http://dba.stackexchange.com/questions/19164/what-to-set-innodb-buffer-pool-and-why, 3 pp.

(Continued)

*Primary Examiner* — Amanda L Willis
*Assistant Examiner* — Vaishali Shah
(74) *Attorney, Agent, or Firm* — Fletcher Yoder PC

(57) ABSTRACT

Systems, apparatuses, and methods for cloud memory sizing are disclosed. An initial database memory allocation is determined for the provisioning of a database server instance. Periodically, sizes of key database tables of the database server instance are measured and an upper and a lower bound ratio are determined based on the key database table sizes and a buffer pool size. The upper and lower bound ratios are used to determine a desired memory allocation from which a report is generated including an interface for generating an instance move action for re-provisioning the database server instance with the desired memory allocation.

20 Claims, 3 Drawing Sheets

(56) References Cited

U.S. PATENT DOCUMENTS

| | | | | |
|---|---|---|---|---|
| 2003/0005024 | A1* | 1/2003 | Grumann | G06F 11/3447 |
| | | | | 718/102 |
| 2005/0278342 | A1* | 12/2005 | Abdo | G06F 9/4843 |
| 2007/0174256 | A1* | 7/2007 | Morris | G06F 17/30536 |
| 2009/0307457 | A1* | 12/2009 | Pafumi | G06F 9/5016 |
| | | | | 711/173 |
| 2013/0282798 | A1* | 10/2013 | McCarthy | G06F 9/5072 |
| | | | | 709/203 |
| 2015/0088856 | A1* | 3/2015 | Hunter | G06F 16/24544 |
| | | | | 707/714 |
| 2015/0263967 | A1* | 9/2015 | Swartzentruber | H04L 47/326 |
| | | | | 370/235 |
| 2016/0070701 | A1* | 3/2016 | Lim | G06F 17/3033 |
| | | | | 707/747 |

OTHER PUBLICATIONS

Tutorials, Using MySQLTuner to Optimize MySQL configuration, rtCamp Solutions Private Limited, 2015, https://rtcanip.com/tutorials/mysql/mysqltuner/, 7 pp.

* cited by examiner

TECHNIQUES AND DEVICES FOR CLOUD MEMORY SIZING

CROSS REFERENCE TO RELATED APPLICATION

This application claims priority to U.S. Provisional Patent Application No. 62/010,621 filed Jun. 11, 2014, which is incorporated herein by reference in its entirety.

TECHNICAL FIELD

The present invention relates in general to techniques and devices for cloud memory sizing and in particular to a memory footprint based customer sizing engine.

BACKGROUND

Cloud computing relates to the sharing of computing resources that are typically accessed via the Internet. A cloud computing infrastructure typically includes a large number of servers that are configured to execute various programs, such as application servers, web servers, and/or database servers.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
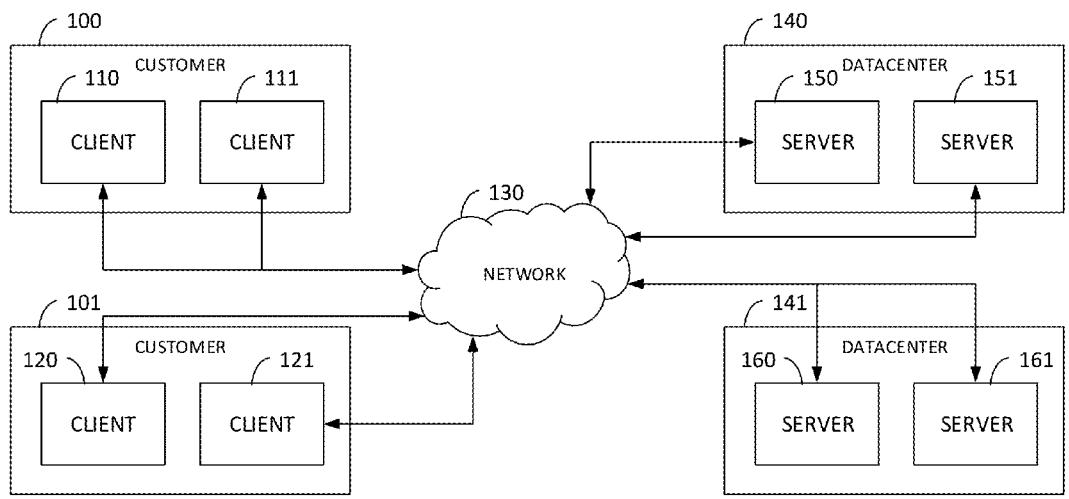
FIG. 1 is a schematic of an exemplary cloud computing system.

Cloud computing can provide various advantages over traditional computing models, including the ability to allocate shared resources amongst many different customers. Under traditional computing models, computing resources are typically allocated to a single customer or entity and substantial portions of those resources may remain unused or underused.

Computing resources of cloud computing infrastructure may be allocated, for example, using a multi-tenant or a single-tenant architecture. Under a multi-tenant architecture, installations or instantiations of application, database, and/or other software application servers may be shared amongst multiple customers. For example, a single web server (e.g., a unitary Apache installation), application server (e.g., unitary Java Virtual Machine) and/or a single database server catalog (e.g., a unitary MySQL catalog) may handle requests from multiple customers. In a multi-tenant architecture, data or applications used by various customers can be commingled or shared. In an implementation of this architecture, the application and/or database server software can distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an exemplary implementation, a customer instance is composed of four web server instances, four application server instances, and two database server instances. As previously described each of these server instances may be located on different physical servers and each of these server instances may share resources of the different physical servers with a number of other server instances associated with other customer instances. The web, application, and database servers of the customer instance can be allocated to two different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server can replicate data to the secondary database server. The cloud computing infrastructure can be configured to direct traffic to the primary pair of web servers which can be configured to utilize the primary pair of application servers and primary database server respectively. In a failure scenario, the secondary servers may be converted to primary servers.

The application servers can include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances can be configured with a database configuration and schema to facilitate the operation of the platform. For example, the database server instance can be configured with various tables for storing metadata about applications, tables/fields, menus, forms, business rules, scripts, and custom UI elements that are used to customize the appearance and operation of the customer instance. In some implementations, the application servers can include web server functionality and the web servers can be omitted.

In an alternative implementation, a customer instance may include only two application servers and one database server. In a given cloud infrastructure system, different implementations of customer instances may be used for different customer instances at the same time. Other configurations and implementations of customer instances may also be used.

The proper allocation of computing resources of a physical server to an instance of a particular software server, such as a database server instance, can be important to the efficient and effective functioning of the cloud infrastructure. If too few resources are allocated, performance of the services provided to the customer using the database server may be degraded. If too many resources are allocated, computing resources may be wasted as the extra allocated resources may not meaningfully increase the performance of the services provided to the customer. Repeated over allocation of computing resources may require that additional server hardware be purchased to satisfy the over allocation, resulting in a greater than necessary cost for providing the cloud infrastructure. In current systems, the amount of possible RAM may be constrained per physical server and the utilization of RAM may be relatively higher than other available computing resources, such as processing cycles (e.g., CPU) and storage (e.g., solid state and magnetic hard disks). Thus, it may be advantageous to more precisely allocate the amount of RAM to each database server instance due to the relative scarcity of RAM resources.

The techniques and devices described herein relate to the allocation of cloud computing resources, and particularly, the allocation of memory (RAM) resources to database servers installed on a particular physical server machine. An initial allocation of RAM to a database server can be generated and the database server can be provisioned using the initial allocation. Periodic measurements can be taken of the database server tables and buffer sizes and ratios are calculated. Based on the ratios, a desired memory allocation can be determined, for example using a pre-determined lookup table of memory allocation sizes to the calculated ratios. The desired memory allocation can be compiled in a report. The report can include functionality to permit a user to initiate an automated action to re-provision the database server using the desired memory allocation. Alternatively, the re-provisioning of the database server can be initiated automatically without user interaction.

FIG. 1 is a schematic of an exemplary cloud computing system. The cloud computing system can include two customers 100 and 101. Each customer may have clients, such as clients 110, 111 for customer 100 and clients 120, 121 for customer 101. Each of clients 110, 111, 120, 121 can be in the form of a computing system including multiple computing devices, or in the form of a single computing device, for example, a mobile phone, a tablet computer, a laptop computer, a notebook computer, a desktop computer, and the like. The customers and clients shown are exemplary, and a cloud computing system may have a different number of customers or clients or may have a different configuration of customers or clients. For example, there may be hundreds or thousands of customers and each customer may have any number of clients.

The cloud computing system can include two datacenters 140 and 141. Each datacenter may have servers, such as servers 150, 151 for datacenter 140 and servers 160, 161 for datacenter 141. Each datacenter may represent a different location where servers are located, such as a datacenter facility in San Jose, Calif. or Amsterdam, Netherlands. Each of servers 150, 151, 160, 161 can be in the form of a computing system including multiple computing devices, or in the form of a single computing device, for example, a desktop computer, a server computer and the like. The datacenters and servers shown are exemplary, and a cloud computing system may have a different number of datacenters and servers or may have a different configuration of datacenters and servers. For example, there may be tens of data centers and each data center may have hundreds or any number of servers.

Clients 110, 111, 120, 121 and servers 150, 151, 160, 161 may be configured to connect to network 130. The clients for a particular customer may connect to network 130 via a common connection point or different connection points. The network 130 can, for example, be the Internet. The network 130 can also be or include a local area network (LAN), wide area network (WAN), virtual private network (VPN), or any other means of transferring data between any of clients 110, 111, 120, 121 and servers 150, 151, 160, 161. Network 130, datacenters 140, 141, and/or blocks not shown may include network hardware such as routers, switches, load balancers, and/or other network devices. For example, each of datacenters 140, 141 may have one or more load balancers for routing traffic from network 130 to various server such as servers 150, 151, 160, 161.

Other implementations of the exemplary cloud computing system are also possible. For example, devices other than the clients and servers shown may be included in the system. In an implementation, one or more additional servers may operate as a cloud infrastructure control, from which servers and/or clients of the cloud infrastructure are monitored, controlled, and/or configured. For example, some or all of the techniques described herein may operate on said cloud infrastructure control servers. Alternatively or in addition, some or all of the techniques described herein may operate on servers such as servers 150, 151, 160, 161.

Figure 2:
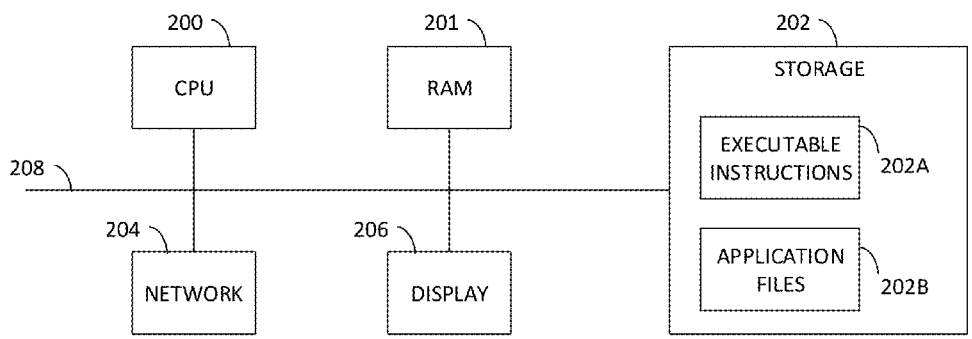
FIG. 2 is a block diagram of an example internal configuration of a client or server of the exemplary cloud computing system.

FIG. 2 is a block diagram of an example internal configuration of a client or server of the exemplary cloud computing system. As previously described clients or servers may take the form of a computing system including multiple computing devices, or in the form of a single computing device, for example, a mobile phone, a tablet computer, a laptop computer, a notebook computer, a desktop computer, a server computer and the like.

The internal configuration can include CPU 200, RAM 201, storage 202, network 204, display 206, and bus 208. CPU 200 can be a conventional central processing unit. CPU 200 can include single or multiple processors each having single or multiple processing cores. Alternatively, CPU 200 can include another type of device, or multiple devices, capable of manipulating or processing information now-existing or hereafter developed.

The RAM 201 can be Random Access Memory or any other suitable type of storage device can be used as memory. RAM 201 can include executable instructions and data for immediate access by CPU 200. RAM 201 typically comprises one or more DRAM modules such as DDR SDRAM. Alternatively, RAM 201 can include another type of device, or multiple devices, capable of storing data for processing by CPU 200 now-existing or hereafter developed. CPU 200 can access and manipulate data in RAM 201 via bus 208.

Storage 202 can include executable instructions 202A and application files 202B along with other data. The executable instructions 202A can include, for example, an operating system and one or more application programs for loading in whole or part into RAM 201 and to be executed by CPU 200. The operating system can be, for example, a Windows, Mac OS X, and/or Linux operating system. The application program can include, for example, a web browser, web server, and/or database server. Application files 202B can, for example, include user files, database catalogs, and configuration information. Storage 202 may comprise one or multiple devices and may utilize one or more types of storage, such as solid state or magnetic.

The internal configuration can also include one or more input/output devices, such as network 204 and display 206. The network 204 and display 206 can be coupled to the CPU 200 via the bus 208. The network 204 can, for example, provide a network interface to network 30 and may take the form of a wired network interface such as Ethernet or a wireless network interface. Other output devices that permit a user to program or otherwise use the client or server can be provided in addition to or as an alternative to the display 206. When the output device is or includes a display, the display can be implemented in various ways, including by a liquid crystal display (LCD) or a cathode-ray tube (CRT) or light emitting diode (LED) display, such as an OLED display.

Other implementations of the internal architecture of clients and servers are also possible. For example, servers may omit display 206. The operations of the CPU 200 can be distributed across multiple machines which can be coupled directly or across a local area or other network. The RAM 201 or storage 202 can be distributed across multiple machines such as network-based memory or memory in multiple machines performing the operations of clients or servers. Although depicted here as a single bus, the bus 208 can be composed of multiple buses.

Figure 3:
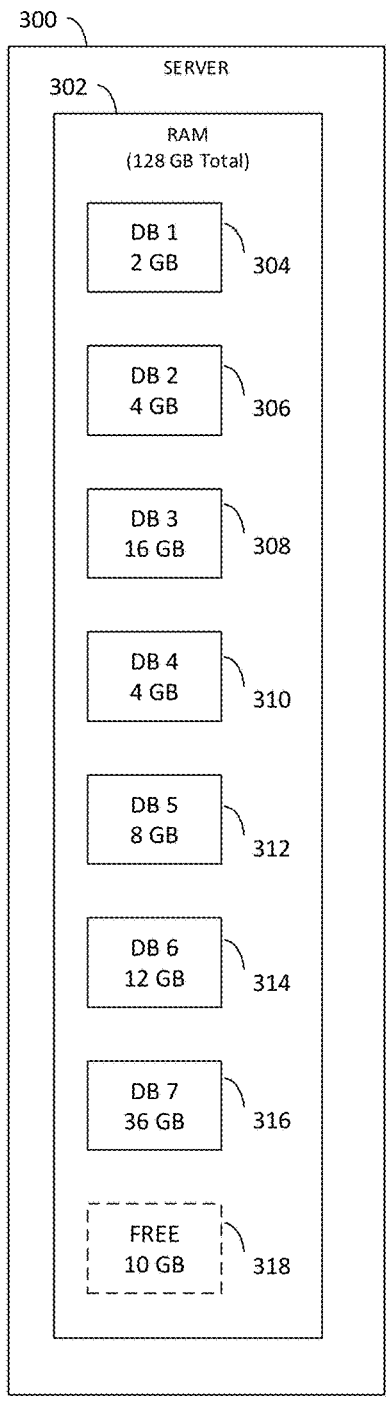
FIG. 3 is a block diagram of a memory allocation of a server to distinct databases.

FIG. 3 is a block diagram of a memory allocation of a server to distinct databases. Server 300 is shown, which can be representative of any of servers 150, 151, 160, 161 or other servers in the cloud computing infrastructure. Server 300 has RAM 302, which can be an implementation of RAM 201 for server 300. Server 300 has a particular amount of RAM 302, which as shown is 128 GB. Server 300 may have different amounts of RAM which may be greater than or less than 128 GB. Typically, the amount of RAM that server 300 can support is limited to a maximum amount for a particular hardware configuration of server 300.

The RAM 302 of server 300 can be allocated to various applications, such as database servers, application servers, an operating system, and other uses. For example, as shown RAM 302 is allocated among DB 1 304, DB 2 306, DB 3 308, DB 4 310, DB 5 312, DB 6 314, DB 7 316, and FREE 318. In this example, various database servers (DB 1-7) are allocated various amounts of memory ranging from 2 GB to 36 GB. These amounts are exemplary and may vary in actual implementations. For example the minimum or maximum amount of memory allocated to each database server may be greater than or less than the amounts shown. Portions of the RAM 302 may be allocated to an operating system, such as some or all of FREE 318 memory. Accordingly, some or all of FREE 318 memory not allocated to database servers might not be available for allocation to additional database servers.

The allocation of memory to each database server may be configuration-based—that is, each database server may be configured to use a particular amount of memory and the operating system may not have other restrictions relating to the allocation of memory to particular database servers. In another implementation, the amount of memory usage by a particular database server may be controlled or monitored external to the database server, for example by the operating system or software operating on the server.

The amount of memory used by a database server may be fixed once the database server is provisioned or created. In this case, in order to change an amount of memory allocated to a database server, a new database server instance may be created and the contents of the existing database server transferred to the new database server instance. This process may be controlled by a database instance move system which may be provided with an identifier of a database server instance and a desired size for the database server instance in order to move the instance. In certain implementations, the move system can identify a server that the database server instance can be moved to based on certain criteria, such as available free resources, location, or other known information. A customer notification can be provided and the provisioning of the new database server instance with the desired size can be performed automatically followed by the copying of database server data to the new database server instance, switching configuration settings so that users are directed to the new database server instance and retiring the original database server after a pre-determined time (e.g., 2 days) to reclaim system resources, such as RAM, allocated to the original database server. In an alternative implementation, the amount of memory used by a database server instance can be adjusted in certain circumstances. For example, the amount of memory may be increased only to the extent that additional memory is available on the physical server for allocation.

Figure 4:
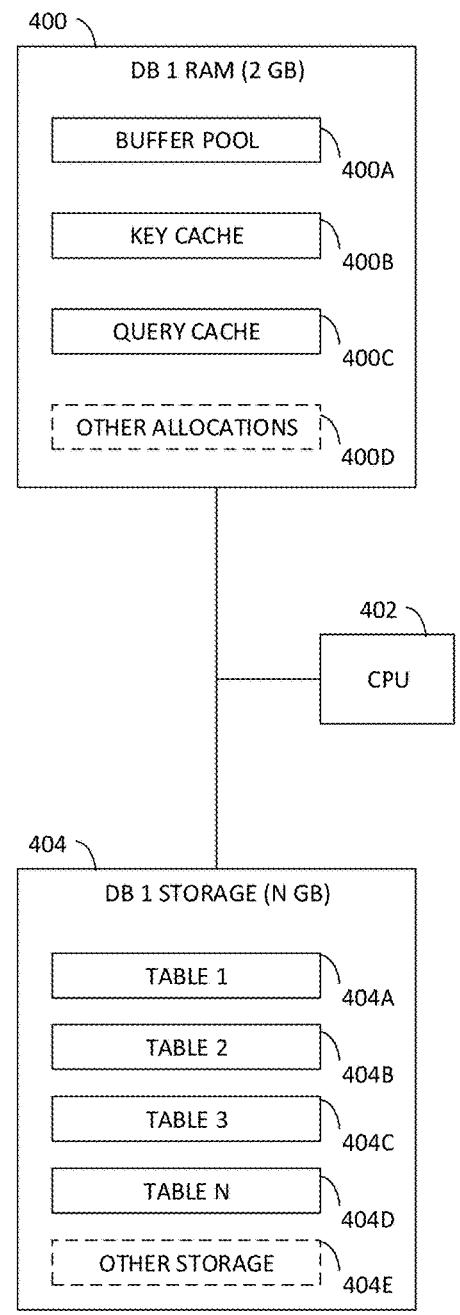
FIG. 4 is a block diagram of memory and storage usage of an exemplary database.

FIG. 4 is a block diagram of memory and storage usage of an exemplary database. A database instance DB 1 can be allocated RAM 400 and storage 404 which can be accessed and processed using CPU 402. RAM 400 can include a buffer pool 400A, key cache 400B, query cache 400C and other memory allocations 400D. Buffer pool 400A can be used to cache table and index database pages from storage 404. Query cache 400B can store some or all previous queries to the database to optimize processing of later similar or same queries. Key cache 400C can be used to store portions of database tables that may be accessed more often than other portions. Each of buffer pool 400A, query cache 400B, and key cache 400C may be allocated a certain portion of RAM 400. The size of each allocation may differ, for example, the buffer pool 400A may be allocated more RAM than query cache 400B and key cache 400C. Other allocations 400D can include other buffers or data structures used in the operation of database instance DB 1. The buffers and data structures used in an implementation of a database instance may vary and may include less or additional buffers than described here.

Storage 404 can include storage of table data including tables 1-N 404A-D. The number of tables can vary and can number in the thousands, for example. Storage 404 can also include other storage 404E for storing other data used by the DB1 database instance, for example configuration data, index data, and other information used in the operation of the DB1 database instance.

Figures 5, 6:
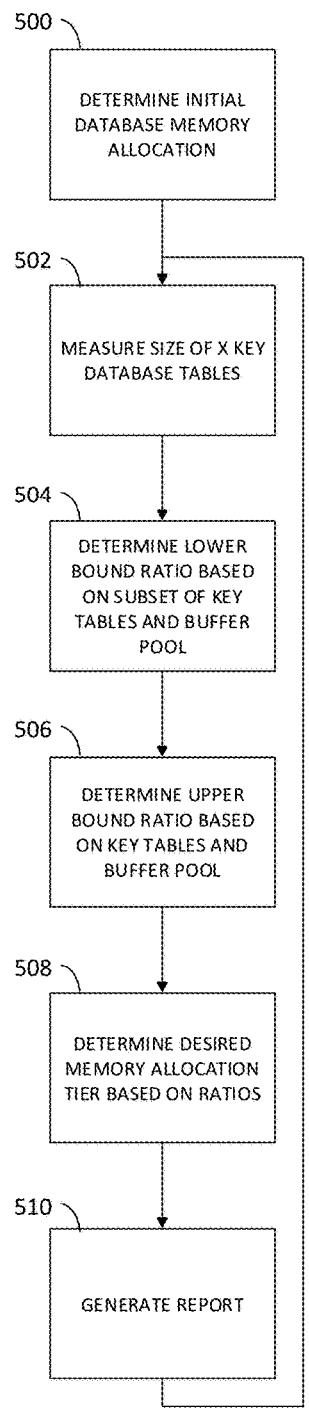
FIG. 5 is a flow chart of a technique for cloud memory sizing.
FIG. 6 is an exemplary user interface for cloud memory sizing.

FIG. 5 is a flow chart of a technique for cloud memory sizing. The technique can be applied to a database server instance that is to be created and maintained. At step 500, an initial database memory allocation can be determined. This determination can be performed before the database instance is created or provisioned. The determination can take into account various criteria available before the actual usage of the database instance can be measured. For example, an initial allocation can be determined based on a value of a contract for the use of the database instance or a number of users to be allocated to the database instance. Other criteria can also be used. A lookup table can be provided mapping values or ranges associated with one or more criteria against certain pre-determined sizes of database instances. For example, sizes xx-small, x-small, small, medium, large, x-large, xx-large, xxx-large can be provided. Each size can have an associated allocation of RAM, such as 1 GB, 2 GB, 4 GB, 6 GB, 8 GB, 12 GB, 18 GB, 24 GB respectively. The database server instance can be provisioned or created with an allocation of RAM equal to the entry associated with the applicable criteria for the instance. The various buffers associated with the database server instance, such as a buffer pool size can be sized proportionately to the amount of RAM allocated or there may be a specific configuration for each size for certain buffers and other database instance configuration options.

At step 502, a size of X key database tables of the database server instance is measured. The number X can be any number of tables such as 3, 4, or 5. The database tables to be measured can be pre-defined or can be selected dynamically, such as based on database table size, number of accesses, or other criteria.

At step 504, a lower bound ratio can be determined based on a subset Y of the X key tables and buffer pool size of the database instance. For example, the lower ratio can be calculated as: $LR=(\Sigma_{n \in Y} s_n)/p*100$; wherein LR is the lower bound ratio, $s_n$ is the size in MB of table n from the set of tables Y, and p is the database buffer pool size in MB.

At step 506, an upper bound ratio can be determined based on the X key tables and buffer pool size of the database instance. For example, the upper ratio can be calculated as: $UR=(\Sigma_{n \in X} s_n)/p*100$; wherein UR is the upper bound ratio, $s_n$ is the size in MB of table n from the set of tables X, and p is the database buffer pool size in MB.

In one implementation, X can include 4 tables and Y can include 3 of the 4 tables. In a database used for an Information Technology Service Management application, for example, the set of X (4) tables can be preselected as including Task, Incident, sys_user, and configuration management database (CMDB) tables. The set of Y (3) tables can omit the CMDB table. Different tables can alternatively be selected in other implementations.

The ratios described herein may be calculated differently than shown in other implementations. For example, a ratio may not be multiplied by 100 or a ratio may be calculated on a different scale (such as the buffer pool size divided by the sum of table sizes). Alternatively different metrics for memory usage can be utilized. For example, a total memory allocation for the database server instance can be used instead of the buffer pool size.

At step 508, a desired memory allocation can be determined for the database instance based on the upper and lower ratios. For example, a table of database sizes can be provided. For each database size, a range of ratios can be provided. For each database size a memory allocation can also be provided. The range of ratios and memory allocations can be pre-determined, dynamically generated, or both. The desired memory allocation can be the memory allocation of the size for which both the upper and lower ratios are within the associated range of ratios. Alternative configurations are also possible. For example, instead of a range of ratios, each database size can have a single target ratio. In this case, the selected size can, for example, be chosen based on the ratio for the size that falls between the upper and lower ratios.

At step 510, a report is generated based on the size identified in step 508. The report can include, for example, information relating to the database server instance and an indication of whether the instance is correctly sized, undersized, or oversized. For example, an instance is oversized if the selected size from step 508 is greater than a current size of the instance and an instance is undersized if the selected size from step 508 is less than a current size of the instance. The report can include functionality to initiate an instance move action for instances that are undersized or oversized in order to resize the instance. Typically an instance move operation can be initiated by human action after review of the report. However, in certain circumstances and implementations, the instance move may be triggered automatically. For example, an automatic move might be triggered if the instance is undersized by a particular margin or degree or for a certain length of time. In an alternative implementation, the report can include functionality for changing the memory allocation of a database server instance without moving the instance. Other techniques for applying the determined desired memory allocation to the database server instance can also be utilized.

The report generated in step 510 can include information about multiple database instances. For example, steps 502 through 508 can be repeated multiple times over numerous database server instances and/or numerous physical servers. The report can be ordered in priority order based on the differences between actual database instance sized and desired database instance sizes as determined in step(s) 508.

Steps 502-510 can be performed periodically. For example, a task can be scheduled on an hourly, daily, or weekly basis during which the steps are performed. The steps can be performed on the same or different periodic schedules for each of the database server instances in the cloud infrastructure, such as by physical server or datacenter. Certain database server instances or physical servers may not be included based on user configuration. Upon each iteration the report generated by step 510 can be updated and/or regenerated. A portion of the report can include metrics indicating the length of time that certain database server instances have been oversized or undersized, or whether particular instances have become more undersized or oversized.

Some or all of the steps of FIG. 5 can be implemented in a memory footprint based customer sizing engine. In one implementation, the memory footprint based customer sizing engine can take the form of one or more Java classes with executable or human-readable code for performing some or all of the steps 500-510 described above. The memory footprint based customer sizing engine can, for example, be located on one or more servers used to manage other servers (management servers) in the cloud computing system, including but not limited to servers 150, 151, 160, 161. The management servers can, for example, include the same or similar platform application and included on some of servers 150, 151, 160, 161. In one implementation, the one or more Java classes can be plugged into or connected to an instance or installation of the platform application to extend the platform functionality to include the functionality of the memory footprint based customer sizing engine. In an implementation, functionality of the memory footprint based customer sizing engine may be accessed via the platform, for example, by using script calls stored in an associated database that are configured to invoke the desired functionality. In one example, the platform can be configured with a menu with an associated script or other functionality for accessing a report generated, for example, by techniques similar to step 510 included in the engine. In another example, the platform can be configured to periodically execute techniques similar to steps 502-508 included in the engine without user intervention. In another example, the report generated by the engine can include one or more links or buttons that when clicked cause the platform to execute other platform functionality for invoking a move operation for an associated database server instance.

FIG. 6 is an exemplary user interface for cloud memory sizing. The exemplary user interface includes an actual capacity size—LB (MB), an actual capacity size—UB (MB), a capacity size, and a desired capacity size. The actual capacity size—LB (MB) relates to the value $s_n$ calculated in step 504 of the size of the database tables used for calculating the lower bound ratio. The actual capacity size—UB (MB) relates to the $s_n$ calculated in step 506 of the size of the database tables used for calculating the upper bound ratio. The capacity size relates to the current sizing of an instance. The desired capacity size relates to the calculated desired size of an instance, such as by using the techniques described above. User interfaces for use with the techniques described herein can take different forms for different implementations and can include or use fields different than those shown here.

The implementations of the cloud computing infrastructure including clients 110, 111, 120, 121 and servers 150, 151, 160, 161 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of clients 110, 111, 120, 121 and servers 150, 151, 160, 161 do not necessarily have to be implemented in the same manner.

Further, in one embodiment, for example, clients 110, 111, 120, 121 and servers 150, 151, 160, 161 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can be implemented using a general purpose computer/processor with a computer program that, when executed, carries out any of the respective techniques, algorithms and/or instructions described herein. In addition or alternatively, for example, a special purpose computer/processor can be utilized which can contain specialized hardware for carrying out any of the techniques, algorithms, or instructions described herein.

Implementations or portions of implementations of the above disclosures can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus, comprising:
at least one memory; and
at least one processor configured to execute instructions stored in the at least one memory to:
determine an initial database memory allocation for a database server instance to be provisioned in a cloud computing infrastructure;
provision the database server instance on a first server in the cloud computing infrastructure with a current memory allocation based on the initial database memory allocation; and
perform the following steps:
determine a set of key database tables of the database server instance, wherein the set of key database tables is less than a total number of database tables associated with the database server instance wherein the set of key database tables comprises a plurality of database tables, of the total number of database tables, that are accessed most often;
measure a size of each of the set of key database tables of the database server instance after determining the set of key database tables of the database server instance;
determine a lower bound based on a ratio of a sum of sizes of a subset of the set of key database tables to a buffer pool size of the database server instance, wherein the subset has at least one table less than the set of key database tables;
determine an upper bound based on a ratio of a sum of sizes of each of the set of key database tables to the buffer pool size of the database server instance;
determine a suggested memory allocation for the database server instance by comparing the lower bound and the upper bound against a lookup table of ratios and memory allocations;
generate a report including the current memory allocation for the database server instance and the suggested memory allocation for the database server instance, wherein the generated report comprises indications of a period of time in which the database server instance has been oversized or undersized; and
generate a user interface to display the report and to provide a user selectable option to re-provision the current memory allocation with the suggested memory allocation.

2. The apparatus of claim 1, wherein the at least one memory and the at least one processor are a part of a management server in the cloud computing infrastructure connected to the first server via a network.

3. The apparatus of claim 2, wherein the at least one processor is configured to execute the instructions to re-provision memory of a second server in the cloud computing infrastructure having at least one database server instance.

4. The apparatus of claim 1, wherein the period of time in which the database server instance has been oversized or undersized is determined based on whether the suggested memory allocation is greater than the current memory allocation.

5. The apparatus of claim 1, wherein the period of time in which the database server instance has been oversized or undersized is determined relative to a dynamic threshold.

6. An apparatus for determining a memory allocation for a database server instance, the apparatus comprising:
   at least one memory; and
   at least one processor configured to execute instructions stored in the at least one memory to:
      determine a set of key database tables of the database server instance, wherein the set of key database tables is less than a total number of database tables associated with the database server instance wherein the set of key database tables comprises a plurality of database tables, of the total number of database tables, that are accessed most often;
      after determining the set of key database tables, determine a lower bound based on a ratio of a total size of a first subset of the set of key database tables of the database server instance to a current memory allocation of the database server instance;
      determine a upper bound based on a ratio of a total size of a second subset of the set of key database tables of the database server instance to the current memory allocation of the database server instance;
      determine a suggested memory allocation for the database server instance by comparing the lower bound and the upper bound against a lookup table of ratios and memory allocations; and
      re-provision the current memory allocation of the database server instance with the suggested memory allocation of the database server instance, wherein the database server instance is one of a plurality of database server instances installed on a first server having a processor, each of the plurality of database server instances having a respective current memory allocation indicating an amount of memory of an available memory present on the first server that is allocated to respective database server instances.

7. The apparatus of claim 6, wherein the at least one memory comprises instructions to periodically perform the instructions.

8. The apparatus of claim 6, wherein the current memory allocation and the suggested memory allocation each is one of a set of pre-determined allocations of RAM.

9. The apparatus of claim 8, wherein each of a buffer pool, query cache, and key cache is allocated a pre-defined portion of the current memory allocation or suggested memory allocation.

10. The apparatus of claim 6, wherein the lookup table comprises a memory allocation to be used for a range of the ratios.

11. The apparatus of claim 6, wherein the instructions comprise instructions to generate a report including the current memory allocation for the database server instance and the suggested memory allocation for the database server instance, and generate a user interface configured to trigger an instance move action to re-provision the database server instance with the suggested memory allocation.

12. The apparatus of claim 6, wherein the instructions comprise instructions to automatically apply the suggested memory allocation when the suggested memory allocation is different from the current memory allocation.

13. The apparatus of claim 6, wherein the instructions comprise instructions to apply the suggested memory allocation by moving the database server instance to a new database server instance with the suggested memory allocation.

14. The apparatus of claim 6, wherein the instructions comprise instructions to apply the suggested memory allocation by changing the current memory allocation of the database instance.

15. The apparatus of claim 6, wherein the at least one memory and at least one processor are a part of a management server in a cloud computing infrastructure connected to the first server via a network.

16. A non-transitory computer-readable medium comprising computer-readable instructions configured to, for a database server instance:
   determine a set of key database tables of the database server instance, wherein the set of key database tables is less than a total number of database tables associated with the database server instance wherein the set of key database tables comprises a plurality of database tables, of the total number of database tables, that are accessed most often;
   after determining the set of key database tables, determine a lower bound based on a ratio of a total size of a first set of key database tables of the database server instance to a current memory allocation of the database server instance;
   determine a upper bound based on a ratio of a total size of a second set of key database tables of the database server instance to the current memory allocation of the database server instance;
   determine a suggested memory allocation for the database server instance by comparing the lower bound and the upper bound against a lookup table of ratios and memory allocations; and
   re-provision the current memory allocation of the database server instance with the suggested memory allocation of the database server instance.

17. The non-transitory computer-readable medium of claim 16, comprising computer-readable instructions to generate a report having the current memory allocation for the database server instance and the suggested memory allocation for the database server instance, and generate a user interface configured to trigger an instance move action to re-provision the database server instance with the suggested memory allocation.

18. The apparatus of claim 1, wherein measuring the size of each of the set of key database tables comprises:
   identifying each database of the set of key database tables based at least in part on database table size or a number of accesses;
   determining a plurality of memory allocation sizes, wherein each memory allocation size of the plurality of memory allocation sizes corresponds to a respective key database of the set of key database tables; and
   summing each memory allocation size of the plurality of memory allocation sizes to obtain the size of each of the set of key database tables.

19. The apparatus of claim 18, wherein determining the upper bound comprises:
   determining the buffer pool size associated with the memory; and
   dividing the size of each of the set of key databases tables by the buffer pool size to obtain a ratio corresponding to the lower bound.

20. The apparatus of claim 1, wherein the set of key databases tables and at least one additional set of key database tables are stored at least partially based on a data cache memory, wherein the at least one processor is configured to execute the instructions stored in the at least one memory to adjust, in response to determining the suggested memory allocation, a portion of the data cache memory allocated for use by the set of key database tables based at least in part on performing a move operation.

* * * * *